United States Patent [19]
Lanham

[11] Patent Number: 5,791,848
[45] Date of Patent: Aug. 11, 1998

[54] STRUCTURE FOR CONVERTING STANDARD DRIVE FASTENER TO SECURITY FASTENER

[75] Inventor: Thomas R. Lanham, Boston, N.Y.

[73] Assignee: McGard, Inc., Orchard Park, N.Y.

[21] Appl. No.: 847,377

[22] Filed: Apr. 24, 1997

[51] Int. Cl.⁶ .......................... F16B 19/00; F16B 33/00
[52] U.S. Cl. ......................... 411/373; 411/431; 411/910
[58] Field of Search .............................. 411/372, 373, 411/374, 377, 429, 431, 910

[56] References Cited

U.S. PATENT DOCUMENTS

| | | | |
|---|---|---|---|
| 4,302,137 | 11/1981 | Hart | 411/910 X |
| 4,784,555 | 11/1988 | Cantrell | 411/910 X |
| 5,120,174 | 6/1992 | Patti | 411/431 |
| 5,350,266 | 9/1994 | Espey et al. | 411/431 |
| 5,590,992 | 1/1997 | Russell | 411/431 |

FOREIGN PATENT DOCUMENTS 70247  1/1983  European Pat. Off. ......... 411/910 X

*Primary Examiner*—Neill R. Wilson
*Attorney, Agent, or Firm*—Joseph P. Gastel

[57] ABSTRACT

A fastener including a fastener body having a drive configuration thereon, and a separate security cap mounted on the drive configuration by an interconnecting structure which can be a snap ring or a flexible spring ring. A security cap which is mountable on a drive configuration of a fastener including a body, a socket in the body, and an interconnecting member such as a snap ring or a spring ring mounted in a groove in the wall of the socket.

23 Claims, 6 Drawing Sheets

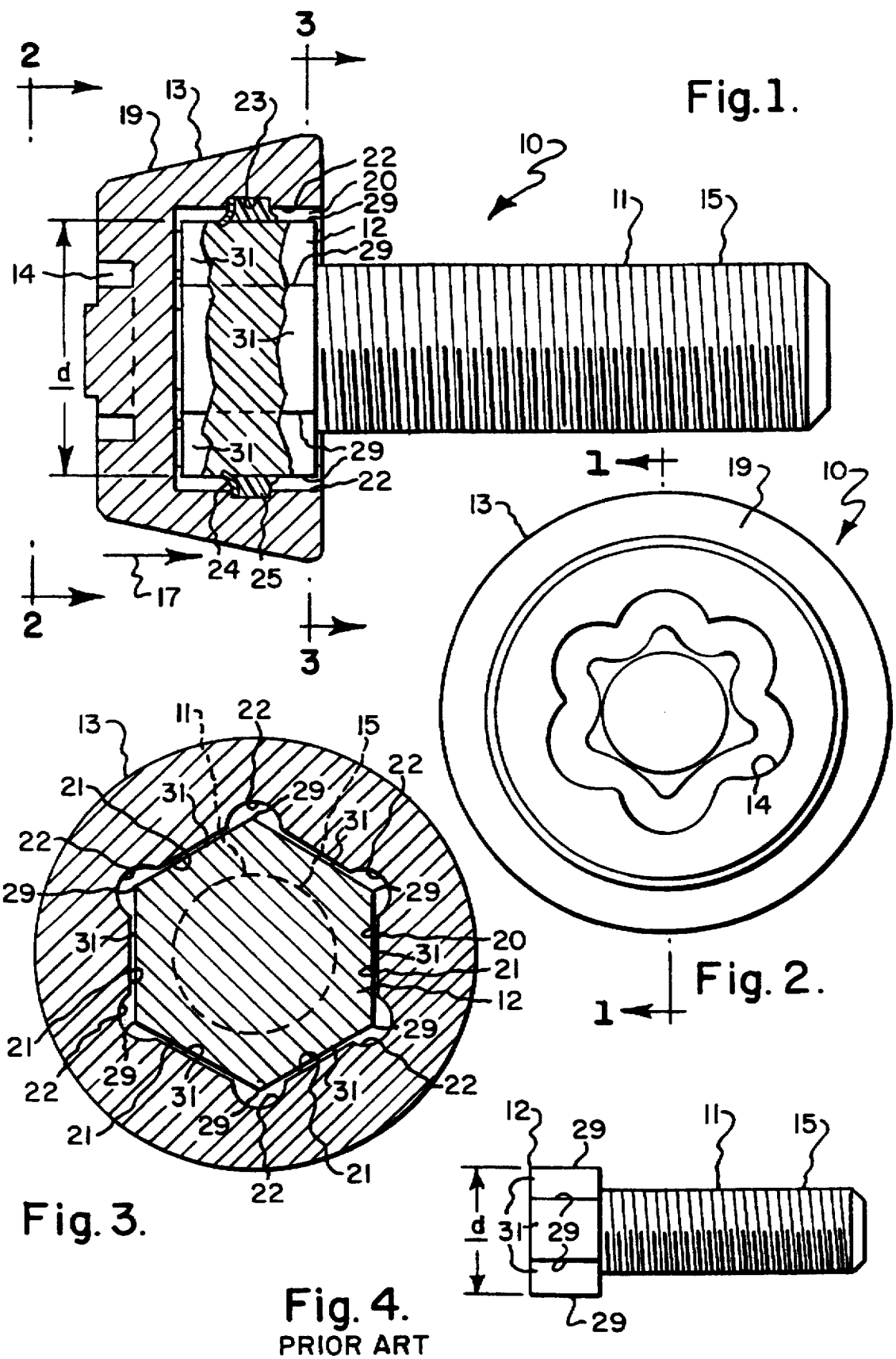

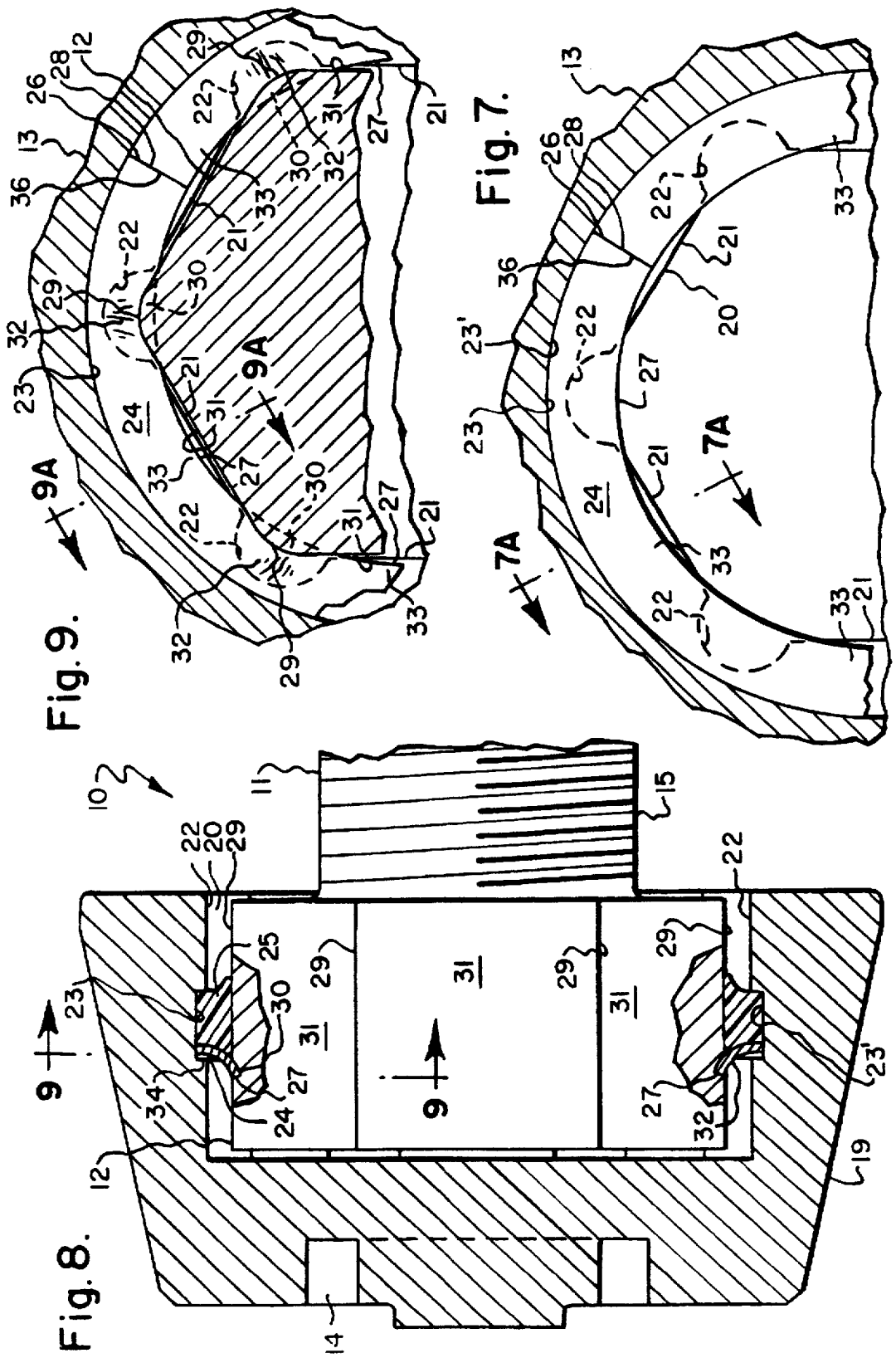

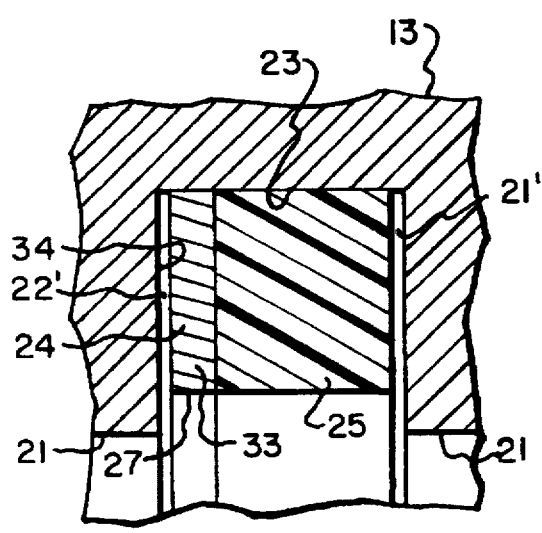
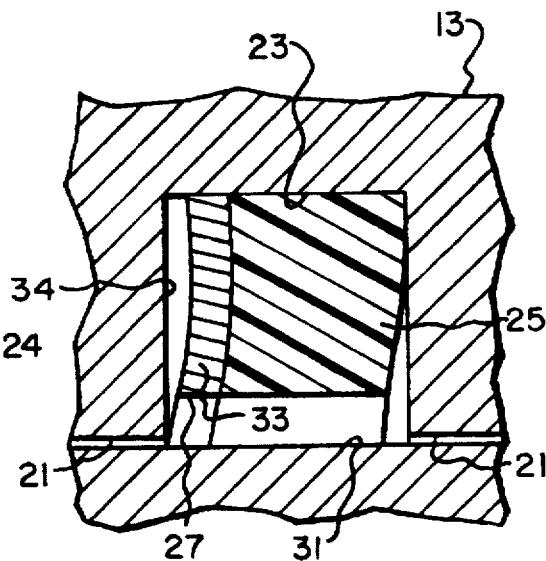
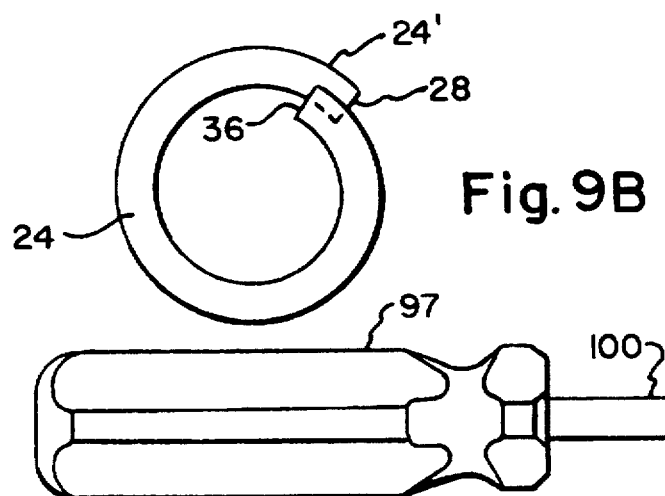
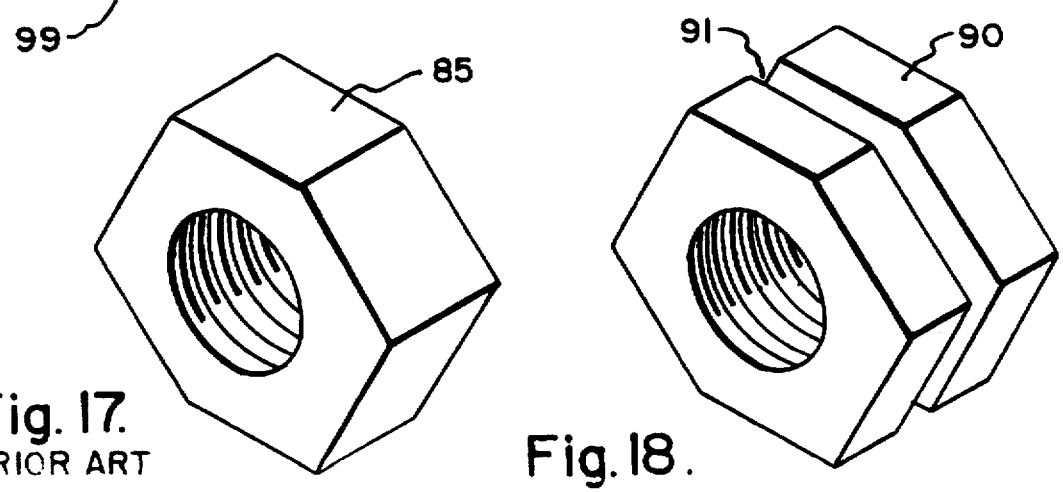

STRUCTURE FOR CONVERTING STANDARD DRIVE FASTENER TO SECURITY FASTENER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to structures for converting fasteners having standard drive constructions to security fasteners.

By way of background, insofar as known, there were no types of fasteners, such as nuts or bolts, which could be installed by means of a conventional tool, such as a socket wrench, hexagonal wrench or screwdriver, and which could be converted to a security type of fastener by merely adding a security cap in an extremely simple manner. However, in the past, a device such as shown in U.S. Pat. No. 4,712,586 was known wherein a fastener could be installed by means of a special tool, but a key was required to unfasten it.

BRIEF SUMMARY OF THE INVENTION

It is one object of the present invention is to provide a security cap which can be utilized to convert a conventional fastener having a standard drive into a security fastener requiring a special key to unfasten it by merely mounting the security cap on the fastener.

Another object of the present invention is to provide an improved security fastener which is a combination of a conventional fastener with a security cap mounted thereon. Other objects and attendant advantages will readily be perceived hereafter.

The present invention relates to a fastener comprising a fastener body, a conventional drive configuration on said fastener body, and a separate security cap mounted over said conventional drive configuration.

The present invention also relates to a security cap comprising a body, a socket in said body, an internal surface in said body defining said socket, a flexible member extending inwardly into said socket from said internal surface, and a key-receiving configuration on said body.

The various aspects of the present invention will be more fully understood when the following portions of specification are read in conjunction with the accompanying drawings wherein:

BRIEF DESCRIPTION OF THE SEVERAL VIEWS OF THE DRAWING

FIG. 1 is a fragmentary cross sectional view taken substantially along line 1—1 of FIG. 2 and showing a conventional hexagonal bolt having the preferred embodiment of a security cap assembled thereon;

FIG. 2 is a view taken substantially in the direction of arrows 2—2 of FIG. 1 and showing the curvilinear groove in the security cap which receives a suitable key for turning the bolt of FIG. 1;

FIG. 3 is a cross sectional view taken substantially along line 3—3 of FIG. 1;

FIG. 4 is a side elevational view of a conventional bolt having a hexagonal head;

FIG. 7 is a fragmentary enlarged cross sectional view taken substantially along line 7—7 of FIG. 6;

FIG. 7A is an enlarged fragmentary cross sectional view taken substantially along line 7A—7A of FIG. 7;

FIG. 8 is an enlarged fragmentary cross sectional view of a portion of FIG. 1 and showing in greater detail the structure which mounts the security cap on the conventional hexagonal head of a bolt;

FIG. 9 is a fragmentary cross sectional view taken substantially along line 9—9 of FIG. 8;

FIG. 9A is an enlarged fragmentary cross sectional view taken substantially along line 9A—9A of FIG. 9;

FIG. 9B is a perspective view of the split spring ring in a distorted condition for installation into its groove;

FIG. 17 is a perspective view of a conventional prior art hexagonal nut type of fastener;

FIG. 18 is a perspective view of a hexagonal nut fastener having a circumferential groove therein; and FIG. 19 is a side elevational view of a key which is utilized to turn the bolt of any of the preceding embodiments by means of a curvilinear ridge which mates with the curvilinear groove in the security cap.

DETAILED DESCRIPTION OF THE INVENTION

Figure 5:
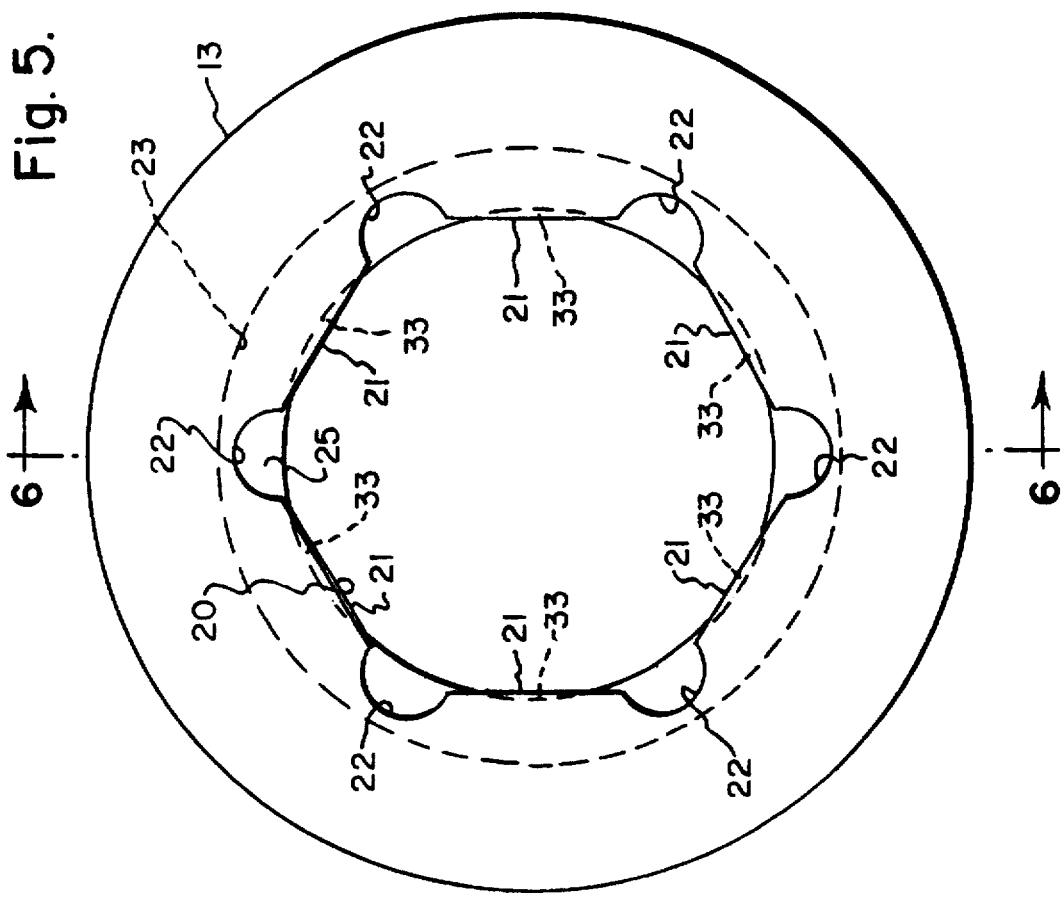
FIG. 5 is an end elevational view taken substantially in the direction of arrows 5—5 of FIG. 6 and showing in enlarged detail the security cap which is mounted on the conventional bolt of FIG. 1.
Figure 6:
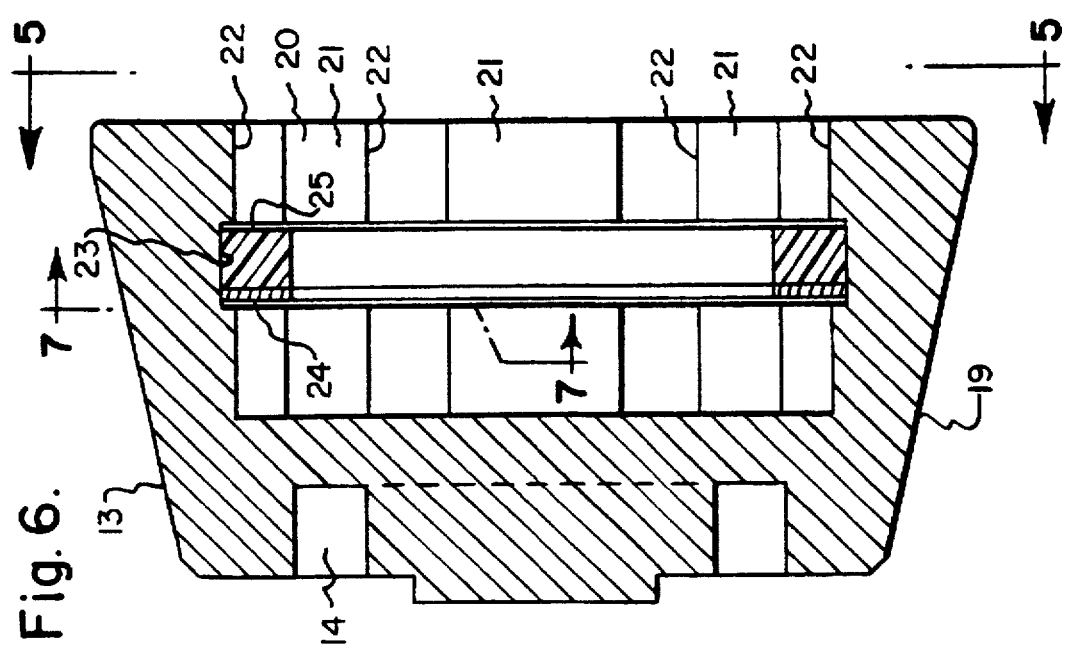
FIG. 6 is a cross sectional view taken substantially along line 6—6 of FIG. 5.

Summarizing briefly in advance, the various security caps of the present invention can convert a conventional bolt or screw or nut having a conventional drive configuration, which is installed by a conventional socket wrench, hexagonal wrench or screwdriver, into a security type of fastener by merely installing a security cap of the present invention onto the conventional fastener without the use of any type of tool.

While the foregoing converting process is applicable in isolated situations where there is a single or a relatively few types of conventional fasteners which have to be converted after installation, the conversion process is of a special benefit along production lines wherein conventional fasteners can be installed by conventional tools and can thereafter be converted to security fasteners by merely mounting a security cap onto the fastener.

In FIGS. 1–9 a preferred embodiment of the present invention is disclosed wherein a security fastener 10 is shown wherein a conventional bolt 11 having a hexagonal head 12 type of drive configuration has mounted thereon a security cap 13 having a curvilinear groove 14 therein which is for receiving a special key. It will be appreciated that, in accordance with the present invention, the conventional hexagonal bolt 11 having the threaded shank 15 is installed in the normal manner by use of a conventional socket wrench, plier, or any other suitable tool. Thereafter, the security cap 13 is installed by merely pushing it onto the hexagonal head 12 in the direction of arrow 17 whereupon, the security cap 13 will become permanently affixed to hexagonal head 12 by virtue of a slip-on locking connection therewith.

The security cap 13 (FIGS. 5 and 6) has an outer frustoconical configuration 19 and a socket 20 of the configuration shown in FIGS. 1 and 5 which includes a plurality of straight sides 21 which are connected by and interspersed with curved grooves 22 (FIG. 5), all of which extend throughout the length of socket 20. An annular groove 23 is formed in the inner surface of socket 20. A spring steel annular ring 24 is held in proper operative position in groove 23 by a flexible resilient plastic ring 25, which may be nylon or any other suitable plastic. The spring steel ring 24 is approximately 0.006–0.010 inches thick and its inside diameter is approximately 0.020 inches smaller than the cross corner distance d (FIGS. 1 and 4) of the hexagonal fastener so that after it is installed by pushing it onto the head 12 in the direction of arrows 17, spaced edge portions 30 (FIG. 9) at edge 27 of ring 24 (FIGS. 8 and 9) will bite into the corners 29 of the hexagonal head 12 to thereby provide an interconnection therewith, while the sides 31 of the hexagonal head lie adjacent to the straight sides 21 of socket 20 to provide a driving relationship between the bolt head and the security cap.

As can be visualized from a comparison of FIGS. 7, 8 and 9, the grooves 22 will permit the portions of the spring steel ring 24 therein to yield as shown at 32 (FIGS. 8 and 9) when the edge portions 30 bite into the corners 29 of the hexagonal head 12. Additionally, the plastic ring 25 will yield to the approximate position shown in FIG. 8 to engage corners 29 and thereby maintain the annular ring 24 in biting relationship with the corners 29. The plastic ring will also take up any looseness between cap 13 and the head 12. The edge portions 33 (FIGS. 9 and 9A) of ring 24 between adjacent grooves 22 will be maintained in a more straightened condition than the flexed portions 32 at grooves 22 because they will be supported by plastic ring 25 adjacent the side wall 34 of groove 23 (FIG. 9A). A comparison of FIGS. 7A and 9A shows the positions of portions of flexible resilient ring 24 before it is mounted and after it is mounted on hexagonal head 12. It will be appreciated that if the groove 23 is sufficiently narrow, the plastic ring 24 may not be required.

In order to install flexible resilient spring ring 24 into groove 23, it is merely necessary to distort it to the condition shown in FIG. 9B and thereafter place the portion adjacent end 28 into groove 23 with the outer edge 24' (FIG. 9B) of the ring against the innermost side 23' of the groove 23 substantially at the position shown in FIG. 7, and thereafter progressively thread counterclockwise portions of the ring 23 into the groove. The split 26 should preferably be located midway between the grooves 22. Thereafter, the plastic ring 25 is installed by merely distorting it sufficiently so that it can enter groove 23, and it will assume the condition of FIG. 7 because of its natural resiliency. Preferably, the combined thickness of spring ring 24 and plastic ring 25 is less than the width of groove 23, and this is depicted by spaces 21' and 22' in FIG. 7A. However, it will be appreciated that plastic ring 25 may be slightly compressed so that there will be no spaces such as 21' and 22'.

It can thus be seen that security cap 13 can be installed by merely pushing it onto the hexagonal head 12 of a conventional bolt 11, and after it has once been installed, spaced portions of the spring tempered steel ring 24 will bite into the ridges 29 of the hexagonal head to prevent removal of the security cap 13 from the head 12 of the fastener 11 while the planar sides 31 of hexagonal head 12 lie adjacent to substantially planar sides 21 of the security cap 13 so that when security head 13 receives a suitable key in its curvilinear groove 14, the security head 13 will be in driving relationship with hexagonal head 12.

At this point it is to be especially noted that the bolt 11 can be cold formed and thus be of sufficient strength for the various applications in which it is used while the cap 13 can be hardened to a level which is required to maintain the level of security which is desired. In this respect, the frustoconical head 19, being hardened, cannot be gripped by conventional tools so that it can be turned. Furthermore, since the cap is a separate member from bolt 11, it can be manufactured by different more economical manufacturing techniques than cold forming, such as powdered metallurgy, and this is due to the absence of threads in security cap 13.

Figure 10:
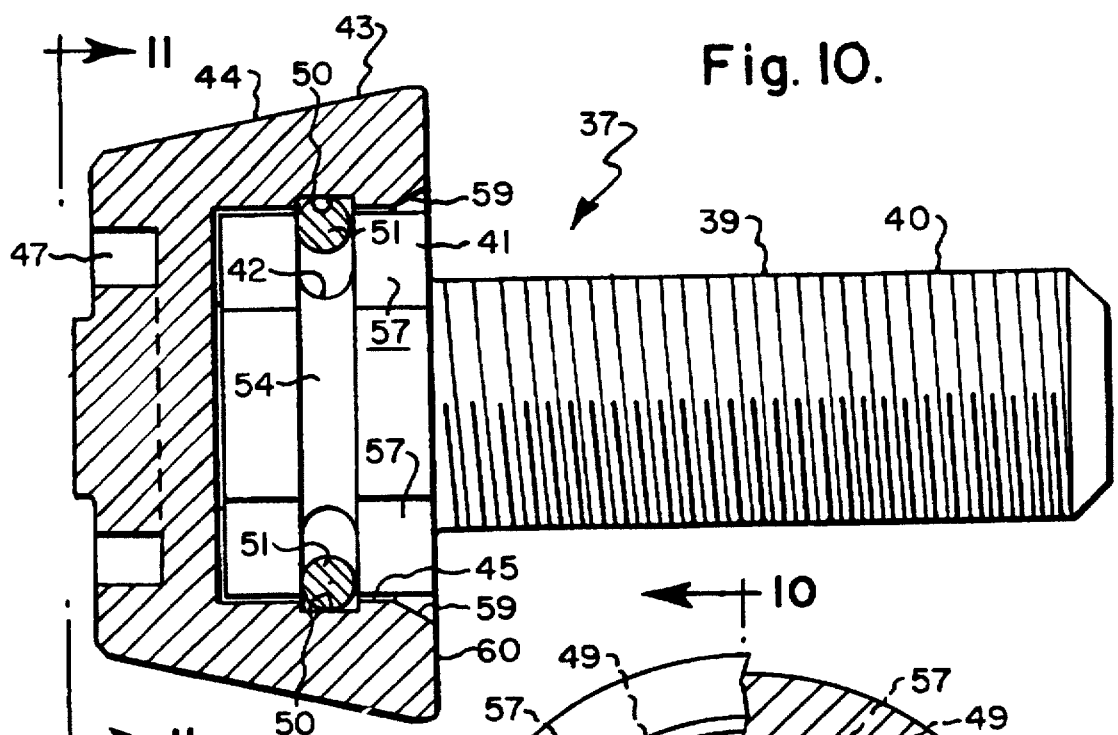
FIG. 10 is a cross sectional view taken substantially along line 10—10 of FIG. 11 and showing another embodiment of the present invention wherein the security cap is mounted on a bolt having an annular groove in its head by means of a snap ring.
Figure 11:
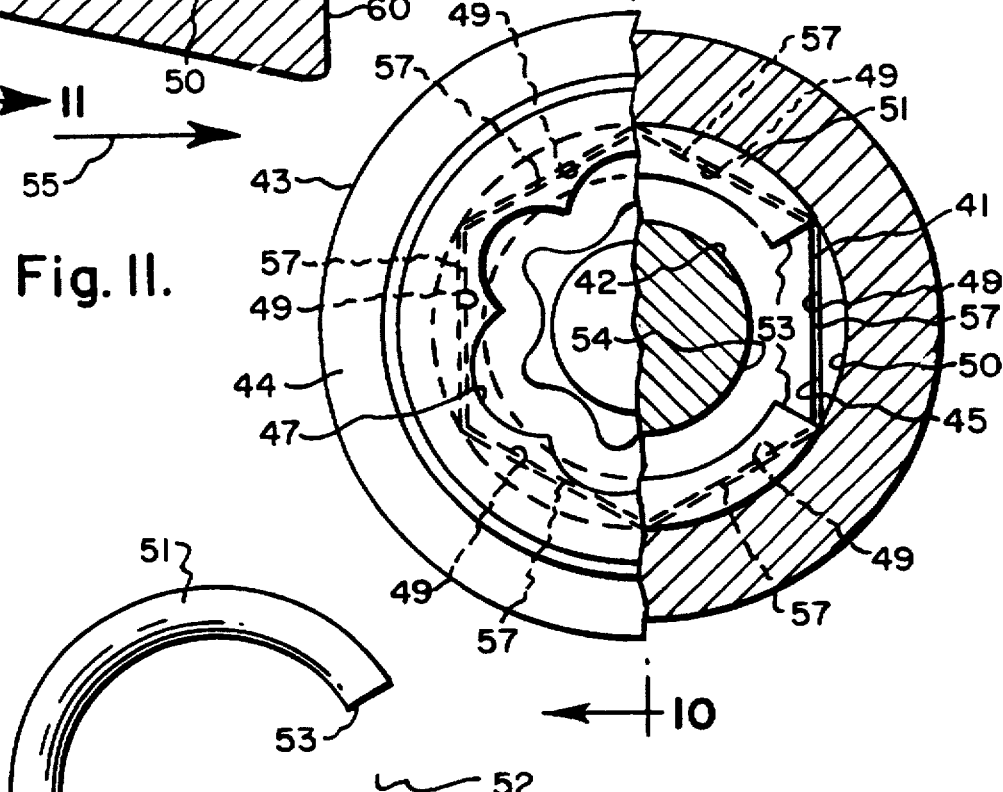
FIG. 11 is an end elevational view, partially broken away, taken substantially in the direction of arrows 11—11 of FIG. 10.
Figure 12:
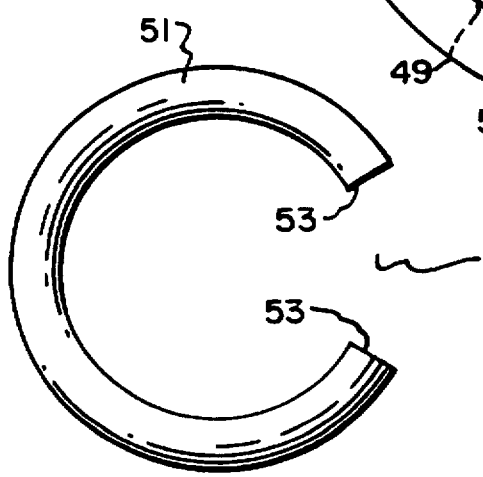
FIG. 12 is a plan view of a snap ring which is utilized to mount the security cap on the bolt of FIG. 10.
Figure 16:
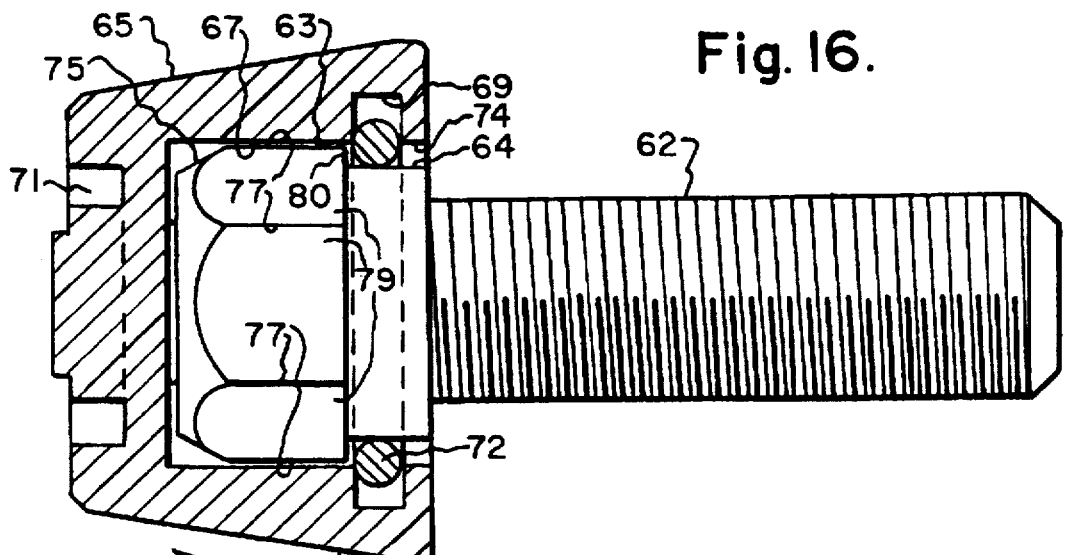
FIG. 16 is a view, partially in cross section, showing the security head of FIGS. 14 and 15 mounted on the conventional bolt of FIG. 13.
Figure 13:
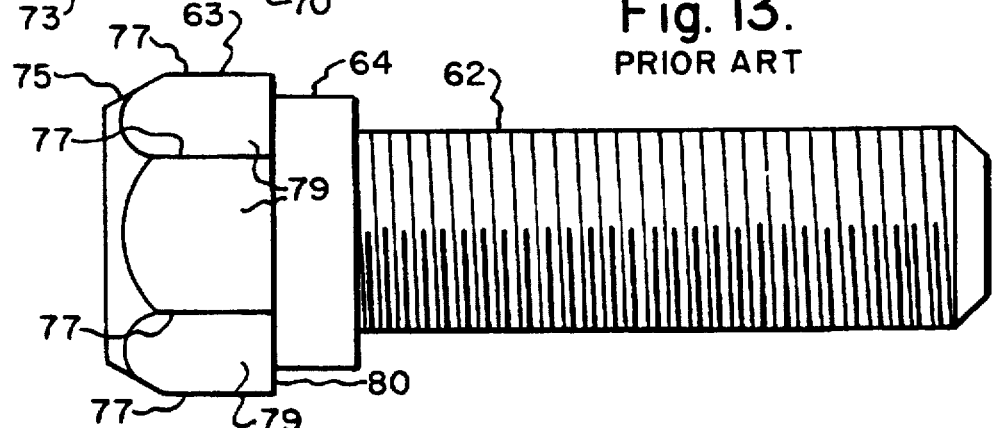
FIG. 13 is a side elevational view of another type of prior art conventional hexagonal head bolt.
Figure 14:
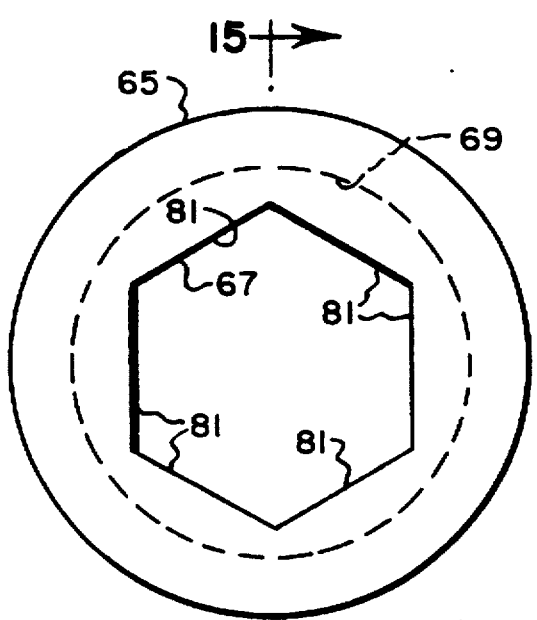
FIG. 14 is a view taken in the direction of arrows 14—14 of FIG. 15 and showing an end elevational view of the security cap which is mounted on the bolt of FIG. 13.
Figure 15:
FIG. 15 is a cross sectional view taken substantially along line 15—15 of FIG. 14.

In FIGS. 10–12 another embodiment of the present invention is disclosed. In this embodiment a security fastener 37 is shown having a bolt with a threaded stem 40 and a hexagonal head 41 which has an annular groove 42 therein. The hexagonal head has a conventional drive configuration. A security cap 43 has an outer frustoconical surface 44 and a socket 45 and a curvilinear groove 47 which is of the same type as groove 14 of FIG. 2. Socket 45 includes a plurality of straight sides 49 and an annular groove 50. A resilient snap ring 51 has an opening 52 between its ends 53 which is sufficiently large to pass over the base 54 of groove 42 when it is slightly expanded and moved in a radial direction. To mount security cap 43 onto hexagonal head 41, it is merely necessary to move it in the direction of arrow 55 onto hexagonal head 41 with hexagonal sides 49 of socket 45 substantially parallel to the hexagonal sides 57 of hexagonal head 41. The cap 43 will move over the snap ring 51 because it has a chamfered annular surface 59 at its end 60. A point will be reached where snap ring 51 springs into annular internal groove 50 of cap 43, and thus there is a slip-on locking connection between hexagonal head 41 and security cap 43 which prevents removal of the security cap 43 from head 41 of bolt 39.

In FIGS. 13–16 another embodiment of the present invention is disclosed. In this embodiment a conventional bolt 62 has a hexagonal head 63 which is adjacent an annular shoulder 64 of less diameter than the cross corner diameter of head 63. This conventional bolt 62 is converted to a security fastener by the mounting thereon of security cap 65 having a hexagonal socket 67 with a groove 69 therein. Security cap 65 has a frustoconical outer surface 70 and a curvilinear groove 71 which is analogous to curvilinear groove 14 of FIG. 2. A resilient snap ring 72, which may be of any suitable type such as shown in FIG. 12 or which can have its opening smaller than that shown in FIG. 12, is located in groove 69. In order to mount security cap 65 onto hexagonal head 63, it is merely moved in the direction of arrow 73, and its end 74 will pass over chamfered annular end 75 of hexagonal head 63. The chamfer 75 will cam split snap ring 72 outwardly so that it passes over the corners 77 between substantially planar sides 79. A point will be reached where the snap ring 72 passes beyond annular shoulder 80 of hexagonal head 63 whereupon it will snap back to the position shown in FIG. 16 to thereby provide a slip-on locking connection between groove 69 and shoulder 80. The sides 81 of socket 67 will lie substantially parallel to sides 79 of hexagonal head 63 to thereby provide a driving relationship therewith. After snap ring 72 has snapped into the position of FIG. 16, the security cap cannot be removed from hexagonal head 63.

While the foregoing description has shown the security caps mounted on bolts, it will be appreciated that they can be mounted in the same manner on fasteners having conventional drive configurations such as screws having hexagonal heads and also on nuts having hexagonal heads. In the latter respect, the embodiments of FIGS. 1–9 and FIGS. 10–12 can be mounted on hexagonal nuts. More specifically, the embodiment of FIGS. 1–9 can be mounted on any type of conventional hexagonal nut 85 such as shown in FIG. 17 and the embodiment of FIGS. 10–12 can be mounted on a nut 90 having a groove 91 therein which is analogous to groove 42. Also, the embodiment of FIGS. 13–16 can be mounted on a hexagonal nut which has a shoulder of smaller diameter than the cross corner distance of the hexagonal configuration.

In FIG. 19 a key 97 is shown having a handle 99 and a shank 100 which mounts a curvilinear ridge 101 which is of mating configuration to the grooves such as 14 (FIG. 2), 47 (FIG. 10) and 71 (FIG. 17). As is well understood in the art, the curvilinear ridge 101 is inserted into a groove to turn the fastener to an unfastening condition.

While a special type of key 97 having a curvilinear ridge 101 has been shown, it will be appreciated that the various security caps of the present invention may have any other suitable type of key-receiving configuration.

While preferred embodiments of the present invention have been disclosed, it will be appreciated that it is not limited thereto but may be otherwise embodied within the scope of the following claims.

I claim:

1. A fastener comprising a fastener body, a conventional drive configuration on said fastener body, a separate security cap mounted over said conventional drive configuration, said separate security cap including a socket bounded by an internal surface, a first groove in said internal surface, said fastener body including a second groove, and a snap ring extending between said first and second grooves.

2. A fastener as set forth in claim 1 including a chamfer on said internal surface at the edge of said socket.

3. A fastener as set forth in claim 1 wherein said security cap includes an outer surface, and wherein said key-receiving configuration comprises a curvilinear groove in said outer surface.

4. A fastener as set forth in claim 3 wherein said security cap includes a second outer surface of frustoconical configuration.

5. A fastener comprising a fastener body, a conventional drive configuration on said fastener body, a separate security cap mounted over said conventional drive configuration, a key-receiving configuration in said separate security cap, a first outer surface on said separate security cap, said key-receiving configuration comprising a curvilinear groove in said first outer surface, a second outer surface of frustoconical configuration on said separate security cap, said separate security cap including a socket bounded by an internal surface, a first groove in said internal surface, said fastener body including a second groove, and a snap ring extending between said first and second grooves.

6. A fastener as set forth in claim 5 including a chamfer on said internal surface at the edge of said socket.

7. A fastener comprising a fastener body, a conventional drive configuration on said fastener body, a separate security cap mounted over said conventional drive configuration, said separate security cap including a socket bounded by an internal surface, a groove in said internal surface, and a flexible retaining ring in said groove.

8. A fastener as set forth in claim 7 including a plastic ring in said groove.

9. A fastener as set forth in claim 7 wherein said separate security cap includes a key-receiving configuration.

10. A fastener as set forth in claim 9 wherein said security cap includes an outer surface, and wherein said key-receiving configuration comprises a curvilinear groove in said outer surface.

11. A fastener as set forth in claim 10 wherein said security cap includes a second outer surface of frustoconical configuration.

12. A fastener as set forth in claim 11 including a plastic ring in said groove.

13. A fastener comprising a fastener body, a conventional drive configuration on said fastener body, a separate security cap mounted over said conventional drive configuration, said separate security cap including a socket, a flexible member in said socket, and an inner edge on said flexible member in frictional engagement with said fastener body.

14. A fastener comprising a fastener body, a conventional drive configuration on said fastener body, a separate security cap mounted over said conventional drive configuration, and a slip-on locking connection between said conventional drive configuration and said separate security head.

15. A security cap comprising a body, a socket in said body, an internal surface in said body defining said socket, a flexible member extending inwardly into said socket from said internal surface, and a key-receiving configuration on said body.

16. A security cap as set forth in claim 15 wherein said body is frustoconical.

17. A security cap as set forth in claim 15 including a groove in said internal surface, and wherein said flexible member comprises a resilient ring in said groove.

18. A security cap as set forth in claim 17 including a plastic ring in said groove.

19. A security cap as set forth in claim 17 wherein said body is frustoconical.

20. A security cap as set forth in claim 17 wherein said resilient ring is a snap ring.

21. A security cap as set forth in claim 20 wherein said body is frustoconical.

22. A security cap as set forth in claim 17 wherein said resilient ring is a thin metal ring.

23. A security cap as set forth in claim 22 wherein said body is frustoconical.

* * * * *